U̇nited States Patent Office 3,591,443
Patented July 6, 1971

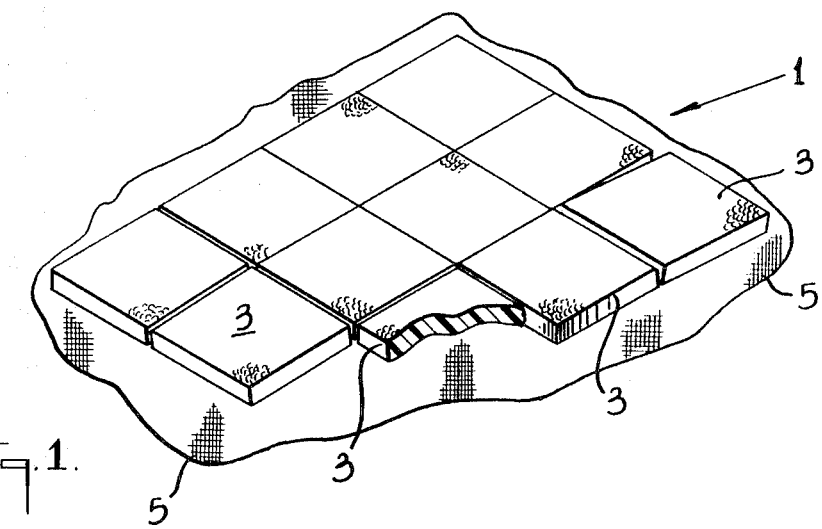
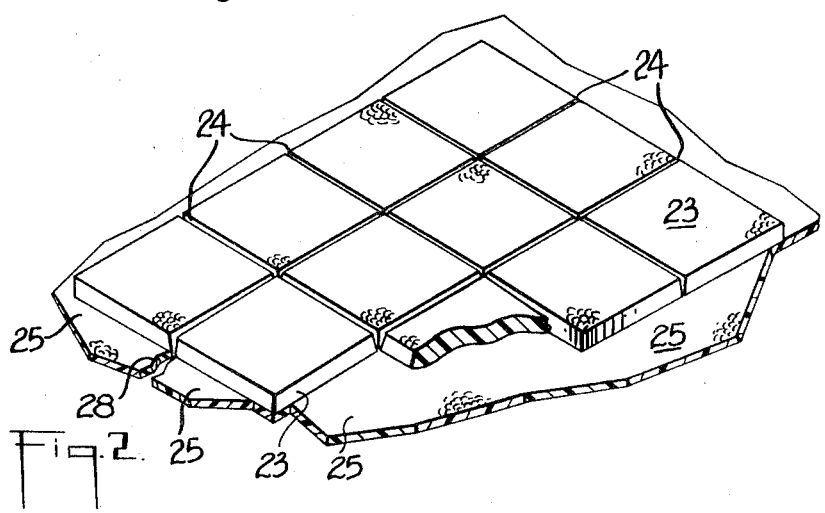
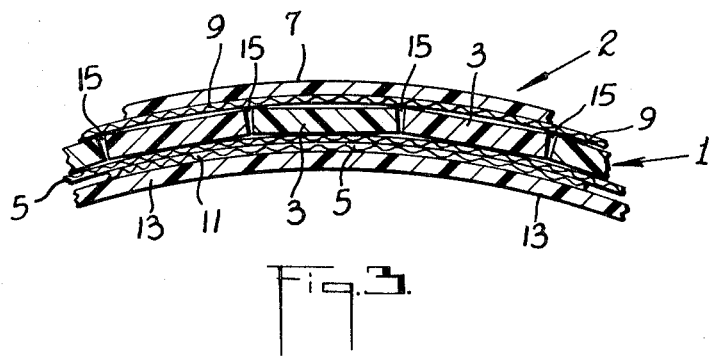
INVENTOR.
EDWIN D. COX
BY
ATTORNEY

3,591,443
FLEXIBLE CORE MATERIAL IN SKIN AND CORE LAMINATES
Edwin Dexter Cox, Scarsdale, N.Y., assignor to Johns-Manville Corporation, New York, N.Y.
Filed Sept. 18, 1967, Ser. No. 668,624
Int. Cl. B32b 3/16
U.S. Cl. 161—37      2 Claims

ABSTRACT OF THE DISCLOSURE

A flexible core for use primarily in making skin and core structures with curved surfaces, the core being composed of blocks of rigid closed-cell polyvinylchloride foam attached to a flexible backing sheet.

BACKGROUND OF THE INVENTION

This invention relates to a flexible core material especially useful in forming skin and core laminates having curved surfaces. It is particularly useful in producing fiberglass boats and similar lightweight structures.

One form of flexible core material which has been used in the manufacture of fiberglass laminates is similar to the material disclosed in U.S. Pat. No. 3,139,371. It is composed of a flexible backing sheet to which are attached blocks of balsa in edge-to-edge relation. In making a boat hull, a suitable resin is first applied to the interior surface of a mold and hardened and glass fiber reinforcement and additional resin are applied over the hardened resin. The surfaces of the balsa blocks remote from the flexible backing are then usually applied against the wet resin-saturated glass fiber on the interior of the mold. Then additional layers of resin and glass fiber are applied over the flexible backing. Because the backing sheet is flexible, the core pieces are movable relative to each other and the entire core is capable of conforming to the general curvature of the mold. This conforming results, however, in spaces between the edges of adjacent blocks at their surfaces facing the mold, the magnitude of the spaces depending on the degree of curvature of the mold. Particularly with balsa core blocks the pattern of these spaces is usually visible in the surfaces of the finished boat hull. The degree of this so-called telegraphing of the block pattern depends to some extent upon the nature of the skin material in the skin and core construction, but the problem has been particularly severe where the skins are composed of glass fiber reinforced polyester resin and where the core blocks are balsa. It has been proposed to use core materials other than balsa wood. Foamed polystyrene and certain other foamed plastics have been suggested, but all of these have exhibited one or more serious disadvantages and there is no indication they have eliminated telegraphing of the block pattern.

SUMMARY OF THE INVENTION

I have discovered a flexible core material of the general type disclosed in U.S. Pat. No. 3,139,371 which can be used in producing skin and core laminates with curved surfaces and which substantially eliminates telegraphing as a major problem even where the skins are composed of glass fiber reinforced polyester resin. This result has been achieved quite simply and unexpectedly by substituting rigid closed-cell polyvinyl chloride foam for the balsa and other core materials heretofore used and proposed. Core material consisting essentially of rigid closed-cell PVC foam provides several advantages in addition to the substantial elimination of telegraphing. Such material is lightweight but relatively strong and provides thermal insulation and increased buoyancy, yet is neither significantly capillary nor absorptive. It is rot proof and moisture impermeable and does not deteriorate or swell in the presence of water as do certain other foamed plastics. PVC foam bonds well to, and provides a good keying effect with, most resins and adhesives. It has a desirable degree of compressive strength in a direction perpendicular to the skins of the skin and core construction and can be produced with a uniformity which insures no variation in properties from one area of the laminate to another, which is not the case with natural products such as balsa. Rigid PVC foam is classified as "non-combustible."

These properties result in skin and core structures having a more uniform appearance and strength and greater over-all resistance to impact and to repeated freezing and thawing. Boats including the core material of this invention are protected from the spread of water within the core upon rupture of the outer skin and, because of the compressibility of the core, have added protection for the inner skin in the event of impact damage to the outer skin.

BRIEF DESCRIPTION OF THE DRAWING

My invention will be more fully understood from the detailed description which follows and from the accompanying drawing, in which:

FIG. 1 is a pictorial view with parts broken away of one form of the flexible core material of my invention;

FIG. 2 is a similar view of another form of the material of my invention; and,

FIG. 3 is a sectional view of a portion of a curved skin and core structure, such as a boat hull or deck, including the core material of FIG. 1.

DETAILED DESCRIPTION

Referring to the drawing, the flexible core material 1 is composed of blocks 3 of rigid closed-cell polyvinylchloride foam arranged in edge-to-edge relationship and attached in any suitable manner to a flexible backing element 5. The backing 5 may be of any suitable material which will satisfactorily support blocks 3 and permit them to have sufficient independent movement to conform to a desired curvature. Such material may be a scrim, cloth or mat of natural or synthetic fibers and the blocks may be attached to the backing by either a continuous coating or spaced spots of adhesive or by any suitable mechanical means. The blocks 3 are shown as square in configuration, but may also be rectangular, triangular, hexagonal, etc. Where intended for use in producing a skin and core structure with a simple curvature the blocks 3 may be in the form of strips. The word "block" is intended to encompass all such forms and configurations and their functional equivalents.

In FIG. 2 both the backing element 25 and the blocks 23 are formed from a single sheet of rigid closed-cell polyvinylchloride foam. The edges of the blocks 23 are formed by cuts 24 made in any suitable manner extending, as illustrated, from the upper surface of the sheet toward but not through the other surface, to provide what is in effect a somewhat flexible sheet of rigid polyvinylchloride foam with attached blocks on one surface. Depending upon the depth of the cuts 24, the remaining continuous portion of the sheet constituting the backing 25 will be more or less flexible and permit relative movement of the blocks 23 either by flexing, as illustrated in the lower center part of FIG. 2, or by cracking, as illustrated by the break 28. The cuts 24 as shown in FIG. 2 are rectangular in shape as might be produced by sawing.

In FIG. 3 there is illustrated a skin and core construction produced in a manner well understood in the laminating and molding arts. The structure is composed of an outer layer 7 of unreinforced resin with an adjacent layer 9 containing reinforcement such as chopped glass mat.

The faces of blocks 3 remote from backing 5 are adhered to the layer 9. Over the backing element 5 of the core material 1 there is a fiber reinforced layer 11 over which there is a layer of unreinforced resin 13. Although the core material of FIG. 1 is illustrated in FIG. 3, the core material of FIG. 2 could, of course, be substituted for it. Because the core 1 has conformed to the curvature of layers 7 and 9, the edges of blocks 3 adjacent these layers have moved away from each other to form spaces 15. Where blocks 3 are composed of rigid closed-cell polyvinyl chloride foam it is possible to use just enough resin in the lay-up to bond the blocks 3 firmly to the layer 9 without any substantial penetration of resin into the spaces 15. In such a construction it has been found that the pattern of the spaces 15 is not visible in or through layers 7 and 9.

The core materials of FIGS. 1 and 2 are useful in producing a variety of skin and core structures. The skins or facing sheets of the laminated structure may be formed of sheet metal, wood, thermoplastic materials, asbestos-cement and other conventional construction materials, as well as the reinforced resin materials illustrated in FIG. 3. Where the core material is of the form illustrated in FIG. 1, it may be desirable that the flexible backing element 5 be composed of a relatively heavy glass fiber reinforcing mat capable of functioning both as a backing for blocks 3 and as the reinforcement in layer 11. Such an arrangement often enables the laminator to save one step in the lay-up of the skin and core structure.

While it is believed that substantially any rigid closed-cell polyvinyl chloride foam having the desired physical properties is suitable for use as a core material, I prefer to use a cross-linked rigid polyvinyl chloride foam produced in accordance with the disclosure of U.S. Pat. No. 3,200,089, with a density of from 1½ to 12 lbs./ft.$^3$. By "closed-cell" I mean a foam having 97 percent or more closed cells as tested by ASTM D–1940–627 adjusted so as not to count the cut cells on the surface of the sample. The term "rigid" is here used in its ordinary meaning in the foam art.

The blocks 3, when in the form of strips, should be of a width which will permit them readily to conform to the required simple curvature and, when polygonal (rectangular, square, etc.) in configuration, should have dimensions enabling them readily to conform to the required compound curvature. It has been found that pieces of square configuration, about ½″ to ¾″ in thickness and 2″ on each side are useful in producing a wide variety of skin and core structures.

The selection of the flexible backing for a particular application depends upon the degree of relative movement between the pieces 3 that will be required in order to conform to the given curvature. Generally speaking the smallest relative movement will be permitted by the construction illustrated in FIG. 2, while the maximum will be permitted with a large mesh scrim to which the blocks 3 are adhered by an adhesive which is soluble in either the resinous material of layer 11 in FIG. 3 or in the resin normally sprayed over backing 5 after blocks 3 are placed against layer 9.

What I claim is:

1. A skin and core structure comprising two skins with a core between the skins, said core consisting essentially of blocks of rigid closed-cell polyvinychloride foam, said skins being curved and composed of polyester resin and reinforcing fibers, and the core between the skins conforming generally to the curvature of the skins with the blocks of the core arranged in edge-to-edge relationship with spaces between faces of adjoining blocks adjacent at least one of the skins, said spaces being substantially free from penetration of resin from the adjacent skin.

2. A boat hull formed of the skin and core structure of claim 1.

References Cited

UNITED STATES PATENTS

| 3,174,166 | 3/1965 | Ehrenberg et al. | 161—161X |
| 3,042,562 | 7/1962 | Peterson | 161—117 |
| 3,139,371 | 6/1964 | Sisko | 161—37 |
| 3,228,820 | 1/1966 | Samson | 161—160X |
| 3,078,202 | 2/1963 | Bellanca et al. | 161—271 |

FOREIGN PATENTS

| 831,077 | 3/1960 | Great Britain | 9—6 |

PHILIP DIER, Primary Examiner

U.S. Cl. X.R.

161—117, 160; 9—6